United States Patent [19]

Henry

[11] Patent Number: 4,744,390

[45] Date of Patent: May 17, 1988

[54] PLASTIC VALVE

[75] Inventor: Ralph E. Henry, Rixford, Pa.

[73] Assignee: Dresser Industries, Inc., Dallas, Tex.

[21] Appl. No.: 108,824

[22] Filed: Oct. 14, 1987

[51] Int. Cl.$^4$ ............... F16K 13/06; F16K 17/40; F16K 5/00

[52] U.S. Cl. ............... 137/797; 251/288; 251/309; 251/312; 251/341

[58] Field of Search ............... 251/284, 286, 287, 288, 251/309, 310, 312, 341, 368; 137/797

[56] References Cited

U.S. PATENT DOCUMENTS

| | | | |
|---|---|---|---|
| 2,511,477 | 6/1950 | Mueller | 251/96 |
| 2,547,116 | 4/1951 | Gould | 251/103 |
| 2,604,293 | 7/1952 | Phillips | 251/103 |
| 2,621,886 | 12/1952 | Mueller | 251/95 |
| 2,642,257 | 6/1953 | Mueller et al. | 251/112 |
| 2,832,562 | 4/1958 | Myers | 251/175 |
| 3,057,370 | 10/1962 | Hamilton | 137/315 |
| 3,066,908 | 12/1962 | Floren et al. | 251/287 |
| 3,079,675 | 3/1963 | Bradbury | 29/157.1 |
| 3,168,280 | 2/1965 | Mueller | 251/217 |
| 3,185,179 | 5/1965 | Harautuneian | 137/625.47 |
| 3,257,096 | 6/1966 | Floren et al. | 251/287 |
| 3,350,057 | 10/1967 | Luckenbill | 251/312 |
| 3,434,691 | 3/1969 | Hamilton | 251/184 |
| 3,503,586 | 3/1970 | Bordes | 251/266 |
| 3,512,944 | 5/1970 | Craig et al. | 23/292 |
| 3,550,902 | 12/1970 | Pidgeon et al. | 251/151 |
| 3,552,439 | 1/1971 | Siver | 137/625.47 |
| 3,563,512 | 2/1971 | Hauffe | 251/312 |
| 4,003,403 | 1/1977 | Nehring | 137/625.41 |
| 4,015,816 | 4/1977 | Semon | 251/285 |
| 4,030,696 | 6/1977 | Bake et al. | 251/288 |
| 4,072,161 | 2/1978 | Schoeneweis et al. | 137/68 R |
| 4,073,314 | 2/1978 | Speelman et al. | 137/625.47 |
| 4,113,228 | 9/1978 | Frye | 251/159 |
| 4,141,538 | 2/1979 | Bake et al. | 251/315 |
| 4,147,184 | 4/1979 | Jess | 137/625.47 |
| 4,217,933 | 8/1980 | Perry, Jr. et al. | 137/625.47 |
| 4,219,046 | 8/1980 | West et al. | 137/375 |
| 4,257,575 | 3/1981 | Runyan | 251/292 |
| 4,262,880 | 4/1981 | Danko et al. | 251/288 |
| 4,319,735 | 3/1982 | Moen | 251/288 |
| 4,497,344 | 2/1985 | Kisiel | 137/797 |
| 4,511,120 | 4/1985 | Conley et al. | 251/288 |
| 4,519,414 | 5/1985 | Anaya | 137/246.22 |
| 4,531,537 | 7/1985 | Smith | 137/246.22 |
| 4,592,534 | 6/1986 | Ueda et al. | 251/266 |
| 4,598,728 | 7/1986 | Ralet | 137/15 |
| 4,609,177 | 9/1986 | Turner et al. | 251/175 |

Primary Examiner—George L. Walton

[57] ABSTRACT

A plastic service valve includes a valve body of molded plastic having upper and lower chambers. The valve body is open at the top and bottom ends. The lower chamber includes inlet and outlet openings. A thrust seat is formed within the upper chamber between the open top end and the inlet and outlet openings in the lower chamber. A valve member is disposed in the valve body and positioned against the thrust seat. Structure is provided in the valve member and adjacent to the thrust seat for locking the valve member to the valve body. The valve member is molded of plastic material to form a unitary body including a plug portion and an actuator portion. The plug portion is rotatable in the valve body between an open position which is aligned with the inlet and outlet openings of the lower chamber of the valve body and a closed position. The actuator portion extends upwardly through the upper chamber portion and receives an operating nut.

14 Claims, 2 Drawing Sheets

PLASTIC VALVE

TECHNICAL FIELD

This invention relates to service valves, and more particularly to molded plastic rotary valves.

BACKGROUND OF THE INVENTION

Molded plastic valves are well known in the art. The increasing use of plastic pipe and tubing by gas utilities has made it necessary to seek improved valves for use with these plastic materials.

Rotary type valves have long been known and many modifications have occurred over the years. Of particular note is U.S. Pat. No. 4,511,120, issued Apr. 16, 1985, to Connelly, et al., and assigned to Kerotest Manufacturing Co. Service valves, such as a ball valve or a plug valve, of molded polyethylene material generally include a one-piece body having a valve seat with first and second passageways opening into the seat. A rotary member is positioned in the valve seat and a passageway through the rotary member is movable between a closed position where the flow between the first and second passages of the valve body is blocked and an open position where the passage through the rotary member is aligned with the passages in the valve body to permit flow between the first and second passages through the rotary member. The rotary member is provided with seals which seal against the walls surrounding the valve body passages to shut off the flow through the passages when the rotary member is turned to the closed position.

In order to prevent leakage between the body and the rotary member, annular O-ring seals are utilized. It is also desirable to test the seals between these components under pressure prior to actual use of the valve. Previously developed valves have utilized an integral stem and plug arrangement where a stem extends upwardly from the plug and is connected to an adapter or nut for turning the stem. In such previously developed valves, the nut forms part of the seal for the valve, and therefore the nut must be installed prior to testing of the valve and seals for leakage. A need has thus arisen for a plastic service valve in which testing of the valve body and rotary member for leaks can be performed independently of additional structure which may form part of the valve and which would interfere with leakage detection during testing. It is desirable that testing be accomplished with the rotary member in both the open and closed positions for a complete testing of the valve.

The adapter structure utilized for actuating the valve, because of its upward projection from the valve body, is exposed to external impact and rotational forces for imparting motion to the rotary member. The adapter may include an operating nut which is turned by the user of the valve for controlling the position of the rotary member. In order to provide feedback to the user that excessive rotary torque is being applied to the nut, previously developed plastic valves have included breakaway tabs. However, once the tab has been broken, the user no longer is provided with the safeguard of knowing if excessive torque is being applied to the nut. A need has thus arisen for a nut in a plastic valve which provides additional feedback information to the user that excessive torque is being applied to the nut during valve operation.

SUMMARY OF THE INVENTION

In accordance with the present invention, there is provided a service valve that includes a plastic valve having an upper chamber and a lower chamber. The lower chamber has an inlet and an outlet opening. The upper chamber has a thrust seat for receiving a valve member. The valve member is inserted into the valve body so that a shoulder on the valve member rests against the thrust seat. A retaining ring is inserted into the valve member to hold the valve member in position against the thrust seat.

The valve member includes a plug portion, a skirt portion and an actuator portion. The plug portion has a flow passage therethrough aligning itself with the inlet and outlet openings in the lower chamber. The plug portion is rotatable in the valve seat between an open position where the flow passage is aligned with the inlet and outlet openings and a closed position where the flow passage is out of alignment with the inlet and outlet openings. This skirt portion located at the bottom of the plug portion is sized for an interference fit with the valve body to provide an external seal and augment valve turning resistance.

The actuator portion extends upwardly from the plug portion through the upper chamber portion. The actuator portion has latching fingers which are engageable with an operating nut. The operating nut is disposed over the actuator portion to provide a cap and includes a direction indicator for the valve.

The nut has two pair of lugs which engage a run in the upper chamber of the valve body. When the nut is turned in the direction to open the valve the lugs contact a stop when the valve member has been turned a sufficient distance. When the nut is turned to the opposite direction to close the valve, a second pair of lugs contact a stop in the run indicating that the valve member is now closed. The dual lug configuration provides an indication of the use of excessive rotational force in operating the valve since one lug can break with the second remaining to prevent further excess rotation.

BRIEF DESCRIPTION OF THE DRAWINGS

For a more complete understanding of the present invention and for further advantages thereof, reference is now made to the following Description of the Preferred Embodiment taken in conjunction with the accompanying Drawings in which.

DESCRIPTION OF THE PREFERRED EMBODIMENTS

Figure 3:
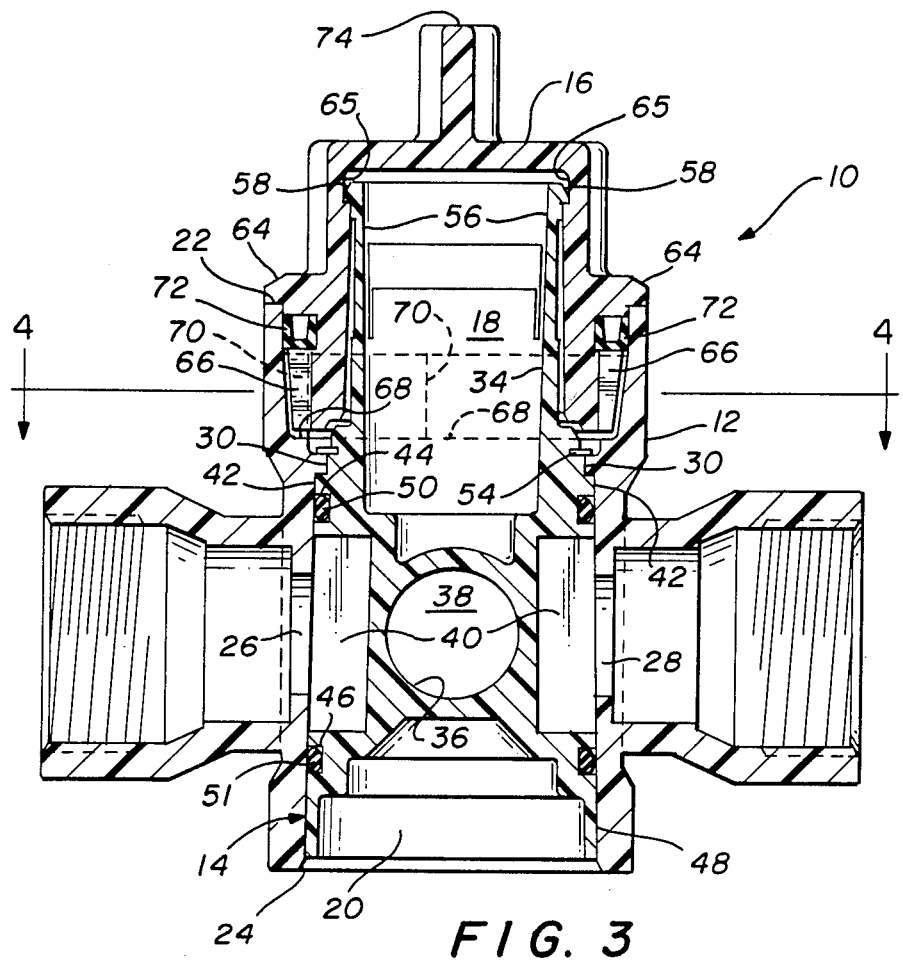
FIG. 3 is a cross-sectional view taken generally along sectional lines 3—3 of FIG. 1.
Figure 1:
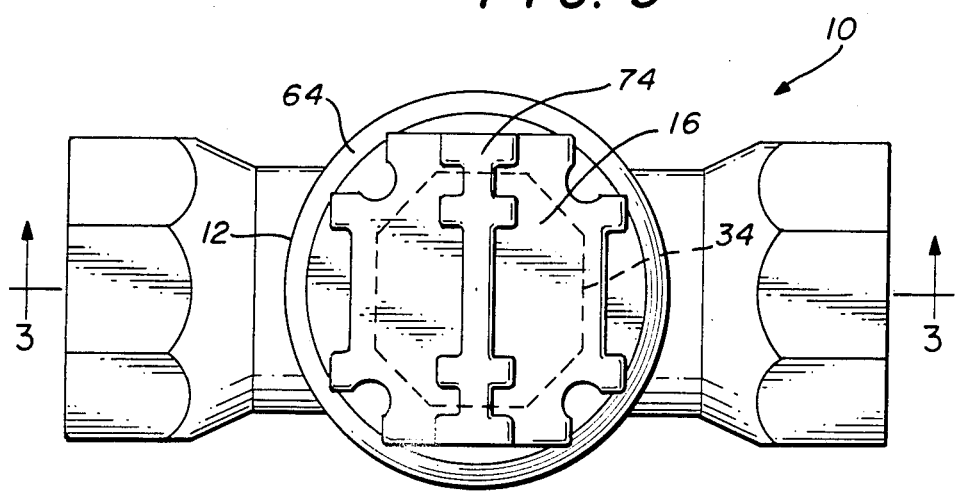
FIG. 1 is a top plan view of the valve of the present invention.

Referring simultaneously to FIGS. 1-4, a plastic service valve of the present invention is illustrated and is generally identified by reference numeral 10. Service valve 10 includes a valve body 12, a valve plug 14, and an operating nut 16, all composed of plastic material.

Valve body 12 has an upper chamber 18 and a lower chamber 20. Valve body 12 has an open top end 22 and an open bottom end 24 with the diameter at bottom end 24 being larger than the internal diameter at top end 22.

Lower chamber 20 includes an inlet opening 26 and an outlet opening 28. Upper chamber 18 includes a thrust seat 30 which is a circumferential protrusion positioned between the open top end 22 and the inlet 26 and outlet 28 openings in lower chamber 20.

Figure 2:
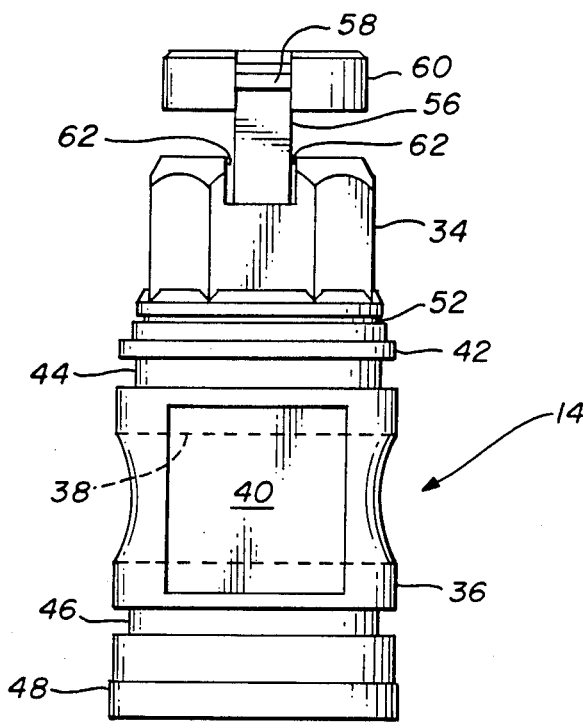
FIG. 2 is a side elevational view of the valve plug of the present invention.

As shown in FIGS. 2 and 3, valve plug 14 is inserted into valve body 12 through open bottom end 24 and positioned against thrust seat 30. Valve plug 14 is of molded plastic material forming a unitary body including an actuator portion 34 and a plug portion 36. Plug portion 36 has a flow passage 38 therethrough. Plug portion 36 is rotatable in thrust seat 30 between an open position where flow passage 38 is aligned with inlet 26 and outlet 28 and a closed position (as shown in FIG. 3) where flow passage 38 is out of alignment with inlet 26 and outlet 28.

In a preferred embodiment, plug portion 36 has counterbores 40 spaced oppositely one another and 90° from flow passage 38. A pair of spring-loaded sealing inserts (not shown are positioned in counterbores 40 so that they engage lower chamber 20 around the inlet 26 and outlet 28 to prevent leakage when valve 10 is in the closed position as shown in FIG. 3. Plug portion 36 is preferably tapered to match the taper of valve body 12 and designed to have an interference fit.

Also in a preferred embodiment, plug portion 36 has a shoulder 42 for engagement with thrust seat 30. A groove 44 is located on plug portion 36 between shoulder 42 and flow passage 38. A groove 46 on plug portion 36 is located between flow passage 38 and valve plug skirt 48 of valve plug 14. Seals 50 and 51 are inserted in grooves 44 and 46, respectively, to prevent fluid leakage. An annular slot 52 (FIG. 2) is provided on plug portion 36 for insertion of a retaining ring 54. Retaining ring 54 secures valve plug 14 to valve body 12 by positioning thrust seat 30 between retaining ring 54 and shoulder 42.

Actuator portion 34 extends upwardly from plug portion 36 through upper chamber 18. In a preferred embodiment, actuator 34 has a pair of upwardly protruding latch fingers 56 which extend beyond the open top end 22 of upper chamber 18. Latch fingers 56 have ears 58 which are used in conjunction with operating nut 16 (as described below). Latch fingers 56 are positioned opposite one another and connected by a ring 60 (FIG. 2). Latch fingers 56 are cut into actuator 34 forming slots 62 on both sides of latch fingers 56. Slots 62 provide latch fingers 56 with greater flexibility.

Operating nut 16 fits over actuator 34. Operating nut 16 is designed to rotate to thereby rotate valve plug 14. Operating nut 16 has an external flange 64 designed to fit over and cover upper chamber 18 of valve body 12. Operating nut 16 has two slots 65 for latching engagement with latch fingers 56 of actuator portion 34.

Figure 4:
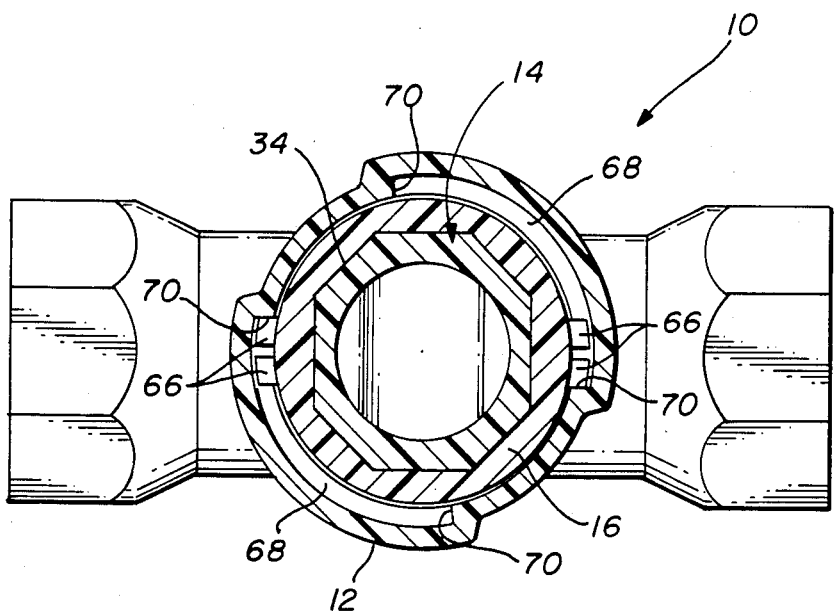
FIG. 4 is a cross-sectional view taken generally along sectional lines 4—4 of FIG. 3.

Referring now to FIGS. 3 and 4, in a preferred embodiment, operating nut 16 has two pair of oppositely facing lugs 66. Upper chamber 18 of valve body 12 has runs 68 for lugs 66 with stops 70 designed to allow operating nut 16 to be turned in one direction until one pair of lugs 66 contacts stops 70 and in the opposite direction until the other pair of lugs 66 contact stops 70. Lugs 66 are breakable to indicate overtorquing of operating nut 16. An airtight seal 72 (FIG. 3) is insertable between external flange 64 and lugs 66. Operating nut 16 includes a flow direction indicator 74 (FIG. 3).

An important aspect of the present invention is the locking structure between valve plug 14 and valve body 12 including thrust seat 30, shoulder 42 of valve plug 14 and retaining ring 54. This structure allows valve plug 14 and valve body 12 to be retained independently without the use of operating nut 16 which allows the present valve 10 to be pressure tested for leaks between valve plug 14 and valve body 12 during both the open and closed positions of valve 10. Once valve 10 has been tested, operating nut 16 can then be installed to the valve plug 14-valve body 12 combination. An additional aspect of the present invention is the interference fit between valve plug skirt 48 and valve body 12 which allows these components to function as a bottom seal for valve 10 to exclude foreign elements, such as, for example, dirt and water and to operate as a torque generator to provide an indication to the user of valve 10 of the operability of valve 10. An interference fit is also present between valve plug 14 and operating nut 16 at the interlocking actuator connection 34, which eliminates drive play for ultimate positioning accuracy.

An additional aspect of the present invention, should the operator apply excessive torque to operating nut 16 is the redundant lug 66 which provides the operator with feedback that excessive torque is being applied should one of the lugs 66 break during rotation of operating nut 16. Even if one of the lugs of a pair of lugs 66 break, the redundant lug is still present to engage a stop 70 to assist the operator in knowing whether the valve 10 is in the open or closed position. The valve 10 is still operable even if both lugs 66 of the two pair of lugs break; however, stops 70 will no longer be engaged and operating nut 16 will be free to continuously rotate. Therefore, it can be seen that the present valve includes numerous advantages in operation and testing.

Although the present invention has been described with respect to a specific preferred embodiment thereof, various changes and modifications may be suggested to one skilled in the art and it is intended that the present invention encompass such changes and modifications as fall within the scope of the appended claims.

I claim:

1. A plastic service valve comprising:
 a valve body of molded plastic, having an upper chamber and a lower chamber;
 said upper chamber having a larger internal diameter than said lower chamber;
 said valve body having an open top end and an open bottom end;
 said lower chamber having an inlet opening and an outlet opening;
 a thrust seat formed in said upper chamber between said open top end and said inlet and outlet openings in said lower chamber;
 a valve member having an external perimeter inserted into said valve body through said open bottom end and positioned against said thrust seat;
 means disposed on said valve member and adjacent said thrust seat for locking said valve member to said valve body;
 said valve membeer being molded of plastic material to form a unitary body including a plug portion and an actuator portion;
 said plug portion having a flow passage therethrough;
 said plug portion being rotatable in said thrust seat between an open position where said flow passage is aligned with said inlet and outlet openings and closed position where said flow passage is out of alignment with said inlet and outlet openings;

said actuator portion extending upwardly from said plug portion through said upper chamber;

said actuator portion including a pair of upwardly protruding latch fingers which extend beyond said open top end of said valve body;

said latch fingers being positioned opposite one another and being connected by a ring;

said ring being spaced apart from said top end of said actuator portion; and said latch fingers being formed in said top end of said actuator portion with slots formed on both sides of each of said latch fingers; and an operating nut for engaging said actuator portion for imparting rotational motion to said plug portion.

2. The plastic service valve of claim 1 wherein said operating nut includes an external flange for covering said upper chamber of said valve body.

3. The plastic service valve of claim 1 wherein said operating nut includes means for indicating the position of said plug portion with respect to said inlet and outlet openings.

4. The plastic service valve of claim 1, wherein said plug portion further includes:
counterbores spaced oppositely of one another and 90 degrees from said flow passage;
a pair of spring loaded sealing inserts positioned in said pair of counterbores, respectively; and
said sealing inserts engaging said lower chamber around said inlet and outlet openings to prevent leakage when said valve is in said closed position.

5. The plastic service valve of claim 1, wherein said plug portion further includes:
a shoulder for engagement with said thrust seat;
a top end adjacent to said actuator portion and a lower end adjacent to said open bottom end of said valve body;
first and second annular grooves;
said first annular groove being disposed between said shoulder and said flow passage;
said second annular groove being disposed between said flow passage and said lower end of said plug portion;
seal means disposed in said first and second grooves for preventing fluid leakage; and
an annular slot for receiving said locking means.

6. The plastic service valve of claim 1, further including:
two pair of oppositely facing lugs located on said operating nut; and
said upper chamber of said valve body having runs for said lugs including stops for allowing said operating nut to be turned in one direction until one pair of said lugs contact said stops and in the opposite direction until the other pair of said lugs contact said stops.

7. The plastic service valve of claim 6 wherein said lugs are breakable to indicate excess rotational force exerted on said operating nut.

8. The plastic service valve of claim 7 wherein said operating nut includes an external flange for covering said upper chamber of said valve body.

9. The plastic service valve of claim 8 and further including:
a seal disposed between said external flange and said lugs.

10. A plastic service valve comprising:
a valve body of molded plastic, having an upper chamber and a lower chamber;
said upper chamber having a larger internal diameter than said lower chamber;
said valve body having an open top end and an open bottom end;
said lower chamber having an inlet opening and an outlet opening;
a thrust seat formed in said upper chamber between said open top end and said inlet and outlet openings in said lower chamber;
a valve member having an external perimeter and being inserted into said valve body through said open bottom end and positioned against said thrust seat;
means disposed on said valve member and adjacent said thrust seat for locking said valve member to said valve body;
said valve member being molded of plastic material to form a unitary body including a plug portion and an actuator portion;
said plug portion having a flow passage therethrough;
said plug portion being rotatable in said thrust seat between an open position where said flow passage is aligned with said inlet and outlet openings and a closed position where said flow passage is out of alignment with said inlet and outlet openings;
said actuator portion extending upwardly from said plug portion through said upper chamber;
said actuator having a top end with an external perimeter and a pair of upwardly protruding latch fingers which extend beyond said open top end of said valve body;
said latch fingers having ears overlaying said external perimeter at said farthest extension;
said latch fingers being positioned opposite one another and connected at said farthest extension by a ring having a circumference less than said external perimeter of said actuator;
said ring being spaced apart from said top end of said actuator;
said latch fingers being cut into said top end of said actuator, forming slots on both sides of each of said latch fingers;
an operating nut for insertion over said actuator;
said operating nut having an internal perimeter designed to match said external perimeter of said actuator portion;
said operating nut having an external perimeter to provide for rotation of said valve member;
said operating nut having an external flange protruding from said external perimeter fitting over and covering said upper chamber of said valve body;
said operating nut having slots cut into said internal perimeter for latching engagement with said latch fingers of said actuator portion;
said operating nut having two pair of oppositely facing lugs located between said external flange;
said upper chamber of said valve body having runs for said lugs with stops to allow said operating nut to be turned in one direction until one pair of said lugs contact said stops and in the opposite direction until the other pair of said lugs contact said stops;
said lugs being breakable to indicate overtorquing of said operating nut;
an airtight seal disposed between said external flange and said lugs; and said operating nut including a direction indicating means for indicating the position of said plug portion with respect to said inlet and outlet openings.

11. The plastic service valve of claim 10, wherein said plug portion further includes:
   counterbores spaced oppositely of one another and 90 degrees from said flow passage;
   a pair of spring loaded sealing inserts positioned in said pair of counterbores, respectively; and
   said sealing inserts engaging said lower chamber around said inlet and outlet openings to prevent leakage when said valve is in said closed position.

12. The plastic service valve of claim 10, wherein said plug portion includes a skirt portion for mating with said valve body open to bottom end for sealing said valve body bottom end.

13. The plastic service valve of claim 10, wherein said plug portion further includes:
   a shoulder for engagement with said thrust seat;
   a top end adjacent to said actuator portion and a lower end adjacent to said open bottom end of said valve body;
   first and second annular grooves;
   said first annular groove being disposed between said shoulder and said flow passage;
   said second annular groove being disposed between said flow passage and said lower end of said plug portion;
   seal means disposed in said first and second grooves for preventing fluid leakage; and
   an annular slot for receiving said locking means.

14. A plastic service valve comprising:
   a valve body of molded plastic, having an upper chamber and a lower chamber;
   said upper chamber having a larger internal diameter than said lower chamber;
   said valve body having an open top end and an open bottom end;
   said lower chamber having an inlet opening and an outlet opening;
   a thrust seat formed in said upper chamber between said open top end and said inlet and outlet openings in said lower chamber;
   said thrust seat comprising a circumferential protrusion;
   a valve member having an external perimeter and being inserted into said valve body through said open bottom end and positioned against said thrust seat;
   means disposed on said valve member and adjacent said thrust seat for locking said valve member to said valve body;
   said valve member being molded of plastic material to form a unitary body including a plug portion and an actuator portion;
   said plug portion having a flow passage therethrough;
   said plug portion being rotatable in said thrust seat between an open position where said flow passage is aligned with said inlet and outlet openings and a closed position where said flow passage is out of alignment with said inlet and outlet openings;
   said plug portion having counterbores spaced oppositely of one another and 90 degrees from said flow passage;
   a pair of spring loaded sealing inserts positioned in said pair of counterbores, respectively;
   said sealing inserts engaging said lower chamber around said inlet and outlet openings to prevent leakage when said valve is in said closed position;
   said plug portion including a skirt portion for mating with said valve body open bottom end for sealing said valve body bottom end;
   said plug portion having a shoulder for engagement with said thrust seat;
   said plug portion having a top end adjacent to said actuator portion and a lower end adjacent to said open bottom end of said valve body;
   said plug portion having first and second annular grooves;
   said first annular groove being disposed between said shoulder and said flow passage;
   said second annular groove being disposed between said flow passage and said lower end of said plug portion;
   a seal disposed in said first and second grooves to prevent fluid leakage;
   said plug portion having an annular slot for receiving said locking means;
   said slot being positioned so as to secure said circumferential protrusion of said thrust seat between said locking means and said shoulder of said plug portion;
   said actuator portion extending upwardly from said plug portion through said upper chamber;
   said actuator portion having a top end with an external perimeter and a pair of upwardly protruding latch fingers which extend beyond said open top end of said valve body;
   said latch fingers having ears overlaying said external perimeter at said farthest extension;
   said latch fingers being positioned opposite one another and being connected at said farthest extension by a ring having a circumference less than said external perimeter of said actuator portion;
   said ring being spaced apart from said top end of said actuator portion;
   said latch fingers being formed in said top end of said actuator portion with slots on both sides of each of said latch fingers;
   an operating nut for engaging said actuator portion;
   said operating nut having an internal perimeter designed to match said external perimeter of said actuator portion;
   said operating nut having an external perimeter to provide for rotation of said valve member;
   said operating nut having an external flange protruding from said external perimeter fitting over and covering said upper chamber of said valve body;
   said operating nut having slots disposed in said internal perimeter for latching engagement with said latch fingers of said actuator portion;
   said operating nut having two pair of oppositely facing lugs located between said external flange;
   said upper chamber of said valve body having runs for said lugs including stops designed to allow said operating nut to be turned in one direction until one pair of said lugs contact said stops and in the opposite direction until the other pair of said lugs contact said stops;
   said lugs being breakable to indicate overtorquing of said operating nut; and
   a seal disposed between said external flange and said lugs.

* * * * *